United States Patent [19]

Januel et al.

[11] Patent Number: 5,395,203
[45] Date of Patent: Mar. 7, 1995

[54] SUPPORT FRAME FOR USE IN LOADING AND UNLOADING, BY MEANS OF A HANDLING APPARATUS HAVING A HYDRAULIC LIFTING ARM, OF GOODS FOR TRANSPORT

[75] Inventors: Bernard Januel, Rochetaillee; Michel Robert, Monzil le Haut, both of France

[73] Assignee: Marrel, France

[21] Appl. No.: 17,777

[22] Filed: Feb. 16, 1993

[30] Foreign Application Priority Data

Feb. 24, 1992 [FR] France .................. 92 02090

[51] Int. Cl.$^6$ .................. B65D 90/18; B63B 25/00
[52] U.S. Cl. .................. 414/498; 108/55.1
[58] Field of Search ............ 414/498, 491, 546, 555;
410/46, 54, 68, 77, 80, 81, 82, 86, 87, 88, 90;
108/55.1, 55.3, 55.5, 56.1; 220/1.5

[56] References Cited

U.S. PATENT DOCUMENTS

| | | | |
|---|---|---|---|
| 3,471,048 | 10/1969 | Terho | 414/491 X |
| 4,132,325 | 1/1979 | Corompt | 414/498 |
| 4,537,540 | 8/1985 | Boughton | 410/82 |
| 4,911,318 | 3/1990 | Bishop | 414/498 X |
| 4,915,567 | 4/1990 | Ellingsen | 414/498 X |
| 4,964,349 | 10/1990 | Bishop | 108/55.1 |

FOREIGN PATENT DOCUMENTS

| | | | |
|---|---|---|---|
| 0082631 | 6/1983 | European Pat. Off. . | |
| 0208624 | 1/1987 | European Pat. Off. . | |
| 0344948 | 12/1989 | European Pat. Off. . | |
| 286143 | 1/1991 | Germany | 414/498 |
| 3927646 | 3/1991 | Germany . | |
| 579470 | 9/1976 | Switzerland . | |
| 1684124 | 10/1991 | U.S.S.R. | 414/498 |

OTHER PUBLICATIONS

Multilift Product Document, "Container Applications of Unlimited Possibilities", Apr. 12, 1991.

*Primary Examiner*—David A. Bucci
*Assistant Examiner*—James Eller
*Attorney, Agent, or Firm*—Remy J. VanOphem; John VanOphem

[57] ABSTRACT

A support frame essentially provided for goods in the form of a container having corner pieces, for the attachment of which the support frame includes on a vertical portion, two locking devices for cooperation with the upper front corner pieces; and on a horizontal portion two locking devices for cooperation with the lower rear corner pieces, whereby the container attached to the support frame rigidifies the vertical portion and the horizontal portion with respect to each other.

16 Claims, 3 Drawing Sheets

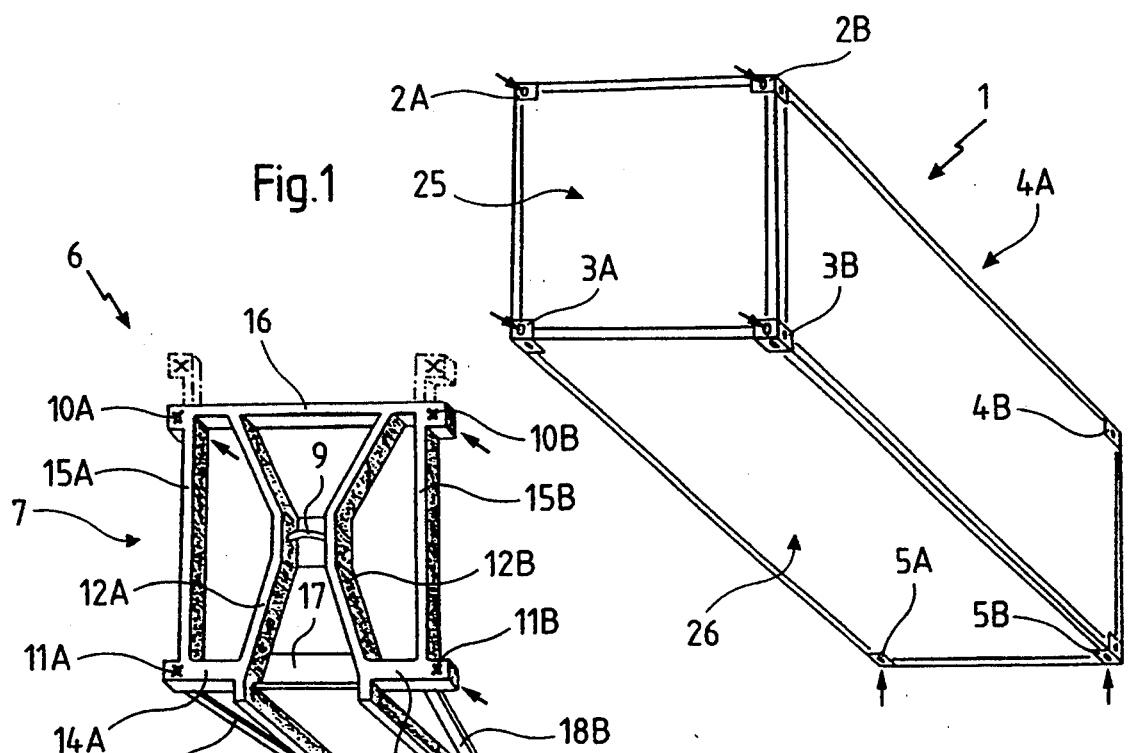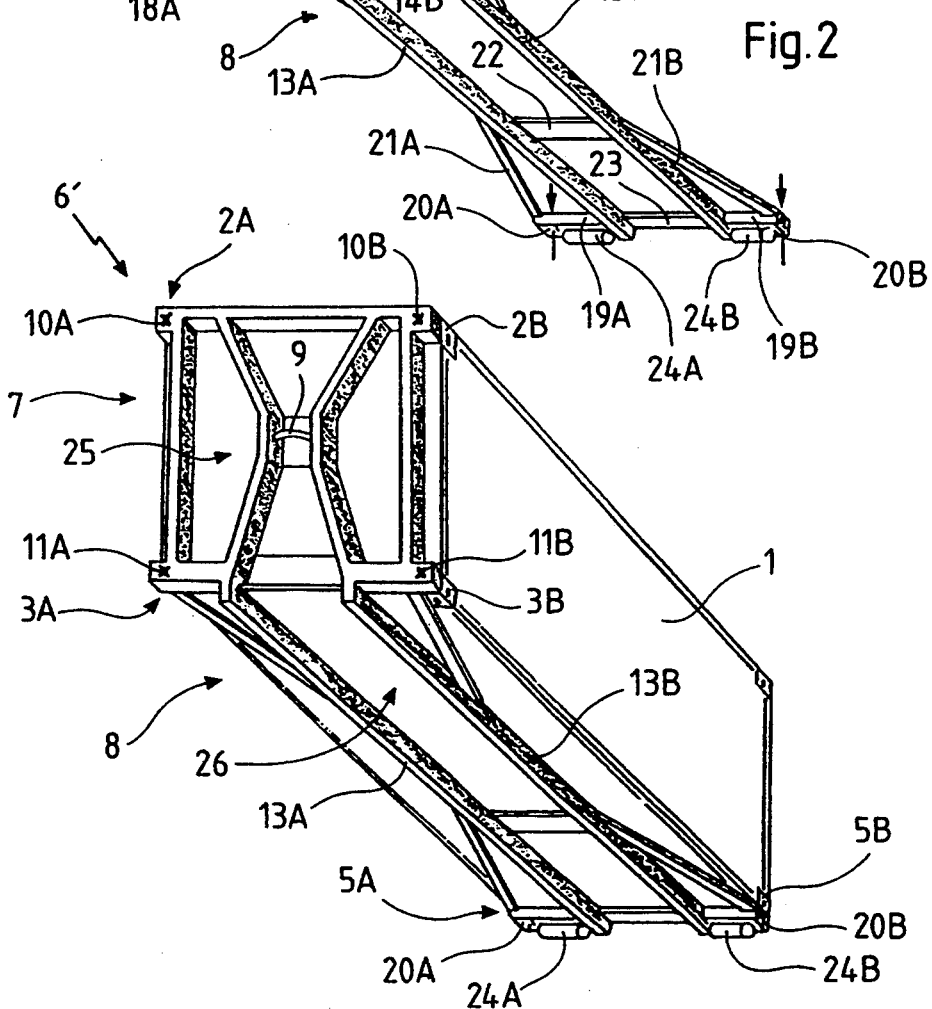

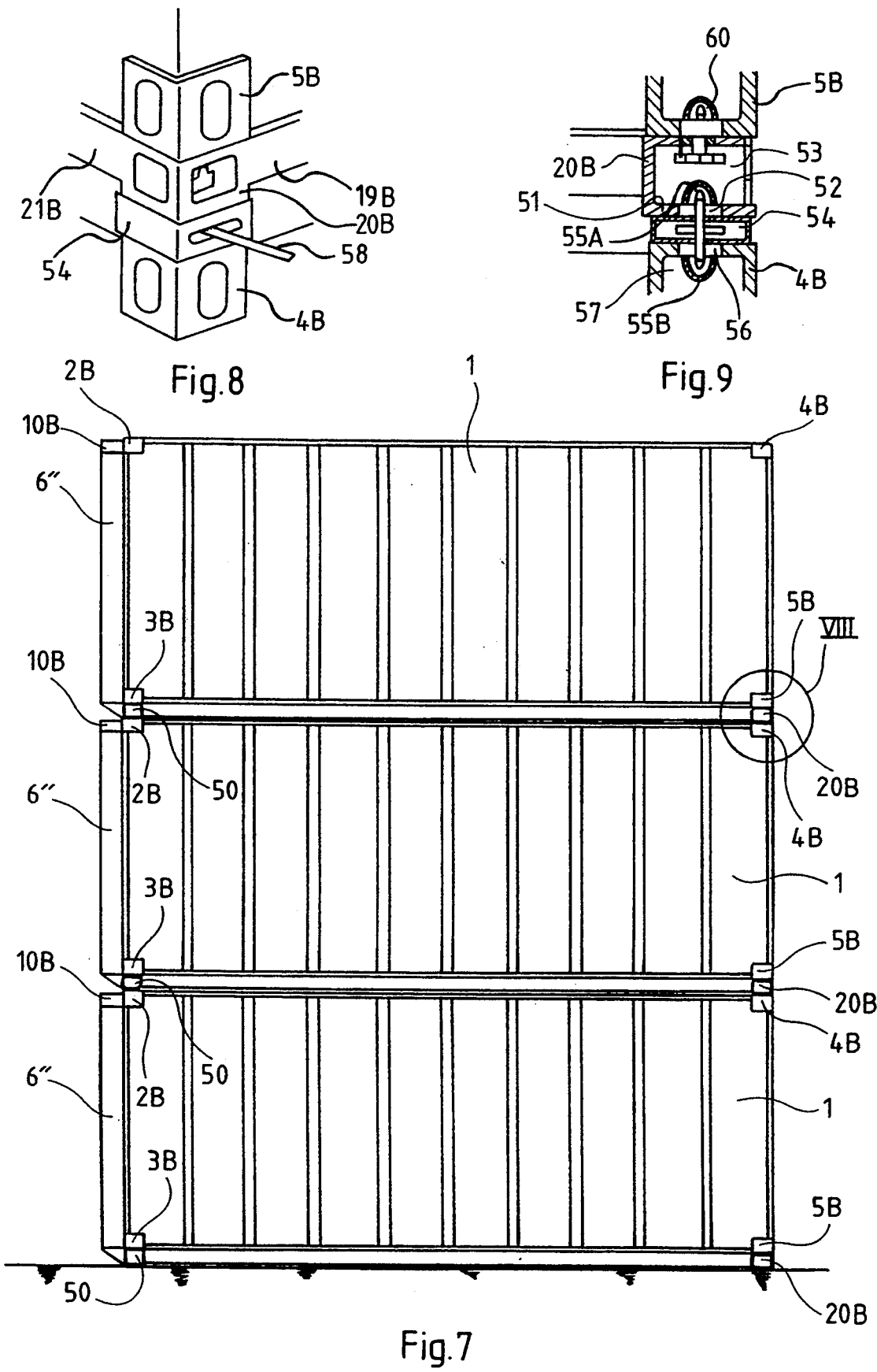

SUPPORT FRAME FOR USE IN LOADING AND UNLOADING, BY MEANS OF A HANDLING APPARATUS HAVING A HYDRAULIC LIFTING ARM, OF GOODS FOR TRANSPORT

BACKGROUND OF THE INVENTION

1. Field of the Invention

The invention is concerned with a support frame for use in the loading and unloading of goods for transport, by means of a handling apparatus having a hydraulic lifting arm.

2. Description of the Prior Art

Such support frames, known as pallets, platforms or flatracks, are already known and embody a horizontal portion, arranged for goods to be placed thereon, which is provided with rings or cleats adapted to cooperate with straps for securing the goods. In addition, the horizontal portion typically includes four rotary locks (twist-locks) which are provided in the case where the goods to be transported consist of a container having corner pieces (corner fittings), each rotary lock being adapted to cooperate with a respective lower corner piece of the container. The horizontal portion is provided with longitudinal rails which are adapted to roll on rollers situated at the rear of a handling apparatus, and the support frame also includes a vertical A-shaped portion which is provided at its upper end with a lifting bar or ear, which is adapted to cooperate with the hook of the handling apparatus. The hook of the handling apparatus is situated at the free end of the lifting arm, and more precisely at the outer end of a jib, which is, for example, articulated to a coupling frame which is itself pivoted on the chassis of the vehicle on which the handling apparatus is mounted.

In order to load the support frame, the lifting arm is tilted towards the rear of the vehicle, the hook situated at the free end of the jib is engaged in the lifting bar, the arm is tilted forward, and during this maneuver the support frame is lifted forward, and drawn toward the vehicle while remaining tilted, with its two lower rails then coming into contact with the rollers mounted at the rear of the vehicle. The rails then roll on the rollers while the support frame continues to advance while returning to its horizontal attitude, and at the end of its movement the support frame rests on the rollers while it is supported at the front by the hook of the arm (see in particular French Patents 2,109,109 and 2,185,520).

SUMMARY OF THE INVENTION

This invention aims to improve the type of support frame just discussed.

To this end, the present invention proposes a support frame for use in the loading and unloading of goods for transport, by means of a handling apparatus having a hydraulic lifting arm. The support frame of the invention includes means for attaching the goods to be transported to it; a vertical portion having a lifting bar which is adapted to cooperate with the hook of the handling apparatus; and a horizontal portion having longitudinal rails which are adapted to roll on rollers situated at the rear of the handling device. The means for attaching the goods to be transported include means for attaching a container having corner pieces, including, on the vertical portion, two first locking devices, each of which is adapted to cooperate with a respective upper front corner piece of the container, the front face of which is disposed in facing relationship with the vertical portion; and on the horizontal portion, two second locking devices, each of which is adapted to cooperate with a respective lower rear corner piece of the container, the lower face of which is disposed in facing relationship with the horizontal portion. The container, when attached to the support frame, thus rigidifies the vertical portion and horizontal portion with respect to each other.

By making use of the rigidity of the container in this way, the inertia of the profiled sections which constitute the members of the support frame in accordance with the invention can be considerably reduced as compared to the support frames of the prior art, in which the container was attached only by means of its lower corner pieces, through four rotary locks situated on the horizontal portion of the support frame.

The support frame according to the invention is thus able to be much lighter than previous support frames, in spite of having a vertical portion which is more extensive than in the prior support frames (it extends as far as the upper corners of the front face of the container to be lifted instead of being limited to an A-shape with the lifting bar at the top end of the latter).

In addition, with a support frame arranged according to the present invention, the horizontal portion is able to be of a height which is smaller than that of the prior art support frames, so that the total height of the vehicle on which the container is loaded can easily lie within the maximum height of four meters allowed by the road regulations in numerous countries.

According to a preferred embodiment of the invention, the means for attaching the container to the support frame includes locking devices, each of which is adapted to cooperate with a respective lower front corner piece of the container.

These locking devices enable points of cooperation between the container and the region situated in the angle of the support frame to be fixed which allows the weight and dimensioning of the support frame to be still further improved.

According to other preferred features of the invention, the support frame includes four horizontal lower engagement surfaces, which are adapted to engage the upper corner pieces of a container on which the support frame is placed.

The support frame according to the invention thus not only enables containers equipped with such a support frame to be stored on the ground, but also enables containers equipped in this way to be stacked upon other containers, several levels high.

According to preferred features of this embodiment, the lower engagement surfaces are formed with an aperture which is open into a free space, so permitting cooperation with a rotary lock.

A container equipped with a support frame can thus be locked in position with respect to a container on which the assembly consisting of the container and the support frame rests, so that this assembly, after having been put together for road transport, can be retained during storage and during transport by other means, especially by sea.

Other features, objects and advantages of the invention will become more apparent from the following description when taken in conjunction with the appended drawings.

BRIEF DESCRIPTION OF THE DRAWINGS

FIG. 1 is a perspective view of a well-known ISO container;

FIG. 2 is a perspective view of a support frame in accordance with the invention, which is adapted for cooperation with the container of FIG. 1;

FIG. 3 is a perspective view of an alternate embodiment of the support frame shown in FIG. 2, with the container of FIG. 1 added;

FIG. 7 is a side view showing three stacked ISO containers, each of which is equipped with a second embodiment of the support frame in accordance with the invention;

FIG. 8 is a perspective view of the detail indicated at VIII in FIG. 7; and

FIG. 9 shows in cross section the elements illustrated in FIG. 8.

DETAILED DESCRIPTION OF THE PREFERRED EMBODIMENT

Figure 4:
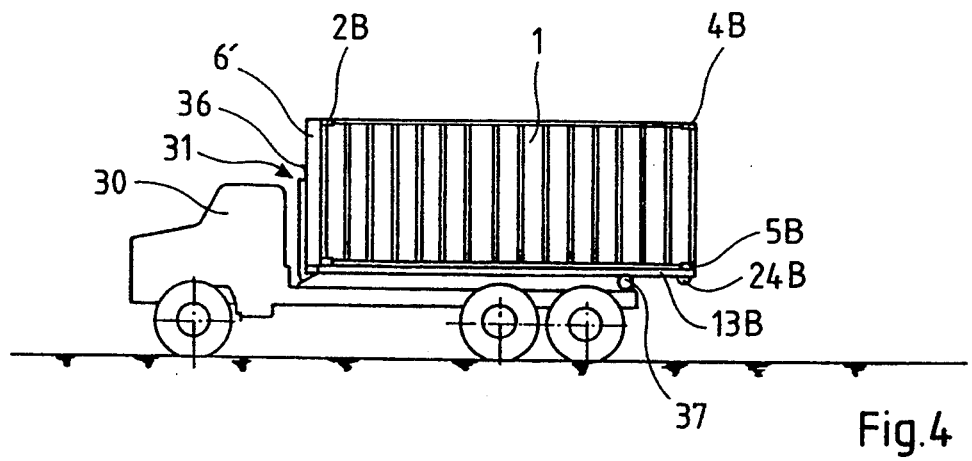
FIGS. 4 to 6 show the unloading of an ISO container which is equipped with a support frame in accordance with the invention, from a vehicle which is equipped with a handling apparatus having hydraulic lifting arms.

A container 1 as shown in FIG. 1 is made in conformity with the standard ISO 668, and more precisely with series 1C laid down in the latter; it has the shape of a parallelepiped having a width of 2438 mm (8 feet), a height which is also 2438 mm, and a length of 6058 mm (20 feet). In accordance with the standard, in each of the eight corners of the container there is a corner piece, these corner pieces being indicated by the following reference numerals, namely 2A at the upper front right and 2B at the upper front left, 3A at the lower front right and 3B at the lower front left, 4A at the upper rear right and 4B at the upper rear left, 5A at the lower rear right and 5B at the lower rear left.

A welded support frame 6, in accordance with the invention and as shown in FIG. 2, embodies a vertical portion 7 and a horizontal portion 8. The vertical portion 7 is provided at a particular height with a lifting or gripping bar 9, while at its upper end it has two locking devices 10A and 10B, at the right and left-hand sides respectively, and at its base two locking devices 11A and 11B, at the right and left-hand sides respectively.

More precisely, the vertical portion 7 includes two inner risers 12A and 12B which are slightly V-shaped, with the gripping bar 9 arranged between the two portions of these risers that are closest together. The base of the riser 12A is joined to the front end of a longitudinal member 13A of the horizontal portion 8, and to a lower outer cross member 14A, which is joined in turn to the base of an outer riser 15A, the top of which is joined to a cross member 16, to which the top of the riser 12A is also joined. The vertical portion includes similar elements on the left-hand side, carrying the same references but with the suffix B, the cross member 16 also acting as a stretcher between the inner risers 12A and 12B. A lower stretcher 17 is provided between the cross members 14A and 14B. The locking devices 10A and 10B are arranged at the top of the riser 15A and the riser 15B respectively, with a telescopic mounting such that the locking devices 10A and 10B are movable vertically between the position shown in full lines and that shown in phantom lines.

The locking devices 11A and 11B are arranged at the base of the riser 15A and the riser 15B, respectively. An oblique strut 18A is provided between the longitudinal member 13A of the horizontal portion 8 and the lower cross member 14A, while, in an arrangement symmetrical with this, an oblique strut 18B is provided between the longitudinal member 13B and the cross member 14B.

In the horizontal portion 8, on the outside and at the rear of the longitudinal member 13A, there is arranged a cross member 19A, at the end of which there is a locking device 20A, the cross member 19A being joined to the longitudinal member 13A by means of an oblique strut 21A. The left-hand part of the horizontal portion 8 is similar and symmetrical to the right-hand part which has just been described, with the elements similar to those in the latter carrying the same reference but with the suffix B. Two stretchers 22 and 23 are provided between the longitudinal members 13A and 13B. A ground contact roller 24A and 24B, is provided below each cross member 19A and 19B, respectively.

The support frame 6' shown in FIG. 3 is similar to the support frame 6, but the locking devices 10A and 10B are fixed instead of being able to slide vertically.

In order to fit the container 1 to the support frame 6 or the support frame 6', a front face 25 of the container is located facing towards the vertical portion 7, with a lower face 26 of the container facing towards the horizontal portion 8 in the manner shown in FIG. 3. The locking devices 10A, 10B, 11A, and 11B then correspond respectively with the portion of the corner pieces 2A, 2B, 3A, and 3B which lie on the front face 25 of the container 1, while the locking devices 20A and 20B correspond, respectively, with that portion of the corner pieces 5A and 5B which are situated on the lower face 26. Each locking device then only needs to be fitted in the corner piece corresponding to it, in order that the container 1 shall be locked on to the support frame 6 or the support frame 6'.

The support frame 6' is provided for cooperation with containers such as the container 1, that is to say those conforming with series 1C of the above mentioned standard, while the support frame 6 is adapted to cooperate not only with containers of series 1C but also those in series 1CC, this last mentioned series being different from the first by virtue of the fact that the height of the container is 2591 mm (8 feet 6 inches) instead of 2438 mm (8 feet).

It will be noted that the support frame 6 or the support frame 6' is no wider than the container 1, and that its length and height exceed those of the container by only a moderate amount, due to the low thickness of the vertical portion 7 and horizontal portion 8.

The stretchers 17, 22 and 23 are arranged within the support frame so that the lifting arm of the handling mechanism is able to fit between the longitudinal members 13A and 13B, and the risers 12A and 12B, in accordance with the DIN 30772 standard. In order to minimize the thickness of the horizontal portion 8, the height of the free space between the longitudinal members 13A and 13B is equal to the minimum that is permitted by the DIN 30772 standard, that is to say 150 mm. More generally, the support frames in accordance with the invention and shown in the drawings are in conformity with this same standard, in which connection, in particular, they include abutments (not shown) for positioning with respect to the chassis of the vehicle, as provided for in that standard.

Figure 5:
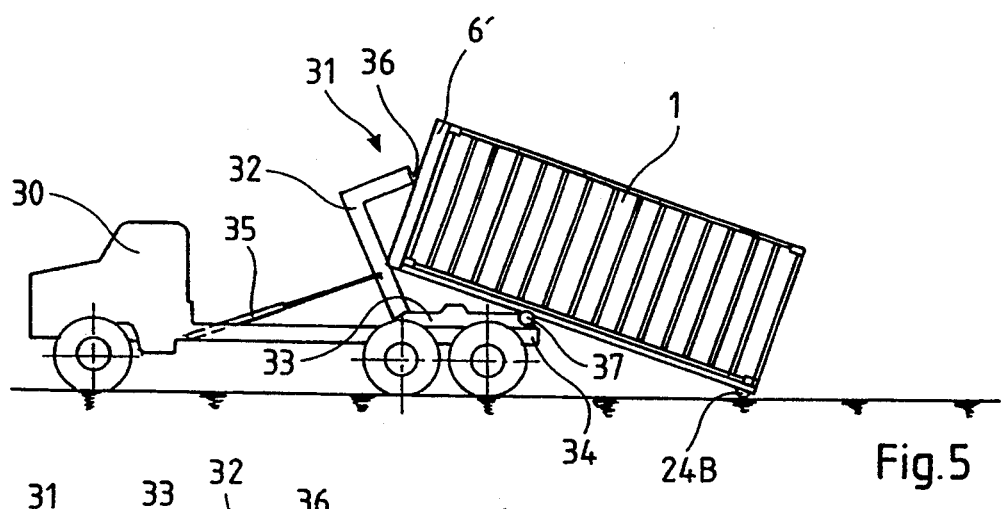
Figure 6:
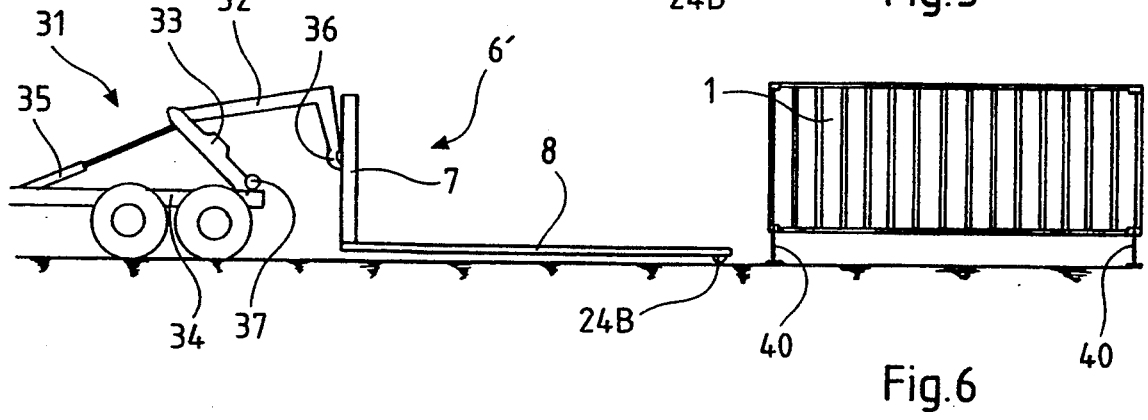

The truck 30 shown in FIGS. 4 to 6 is equipped with a handling apparatus 31 having a hydraulic lifting arm as described in French Patent 2,185,520. This handling apparatus includes a jib 32 which is articulated at its rear end on a coupling frame 33, which is itself pivoted at its rear end on to a chassis 34 of the truck 30, a jack 35 being provided between the front of the chassis and the jib 32. The outer end of the jib carries a hook 36, while rollers 37 are provided at the rear end of the coupling frame 33.

In the position shown in FIG. 4, the truck 30 is loaded with the assembly shown in FIG. 3, which is the support frame 6' on which the container 1 is fixed. In this position the assembly lies at the rear on the rollers 37, through the longitudinal members 13A and 13B, and is supported at the front by the hook 36 in which the gripping bar 9 is engaged.

In order to unload the assembly, the ram of the jack 35 is extended, the jib 32 tilts back about its pivot with the coupling frame 33, the assembly composed of the support frame 6' and container 1 moves backward (with the longitudinal members 13A and 13B acting as rails which are adapted to roll on the rollers 37), and then tilts towards the ground, with which it comes into contact through the rollers 24A and 24B (see FIG. 5), and the jib 32 comes into engagement on an abutment of the coupling frame 33, so that the jib and coupling frame together constitute a rigid assembly which tilts about the pivot between the coupling frame 33 and the chassis 34 as the ram of the jack 35 continues to extend, until the assembly composed of the support frame 6' and container 1 is completely unloaded.

In the configuration shown in FIG. 6, after the assembly consisting of the support frame 6' and container 1 has been placed on the ground, jacks 40 are fitted on the outer faces of the lower corner pieces 3A, 3B, 5A, 5B and the jacks are then extended, the locking devices 10A, 10B, 11A, 11B, 20A and 20B are disengaged, and the truck 30 is moved forward so as to release the support frame 6' from the container 1. The support frame can then be used for another container, possibly after having been loaded again and transported by the truck 30.

More generally, it is possible to employ any known means for handling a container for the purpose of placing it on the support frame 6 or 6', or indeed for removing it from the support frame, especially devices which hook into the upper corner pieces 2A, 2B, 4A and 4B so as to enable the container to be lifted by a crane.

FIG. 7 shows three stacked containers 1, each of which is attached to a modified version of the support frame 6 in accordance with the invention, similar to the support 6' but having the locking devices 11A and 11B replaced by locking devices 50, which are arranged in the horizontal portion 8 instead of in the vertical portion 7, the two locking devices 50 cooperating with the corner pieces 3A and 3B through their lower faces instead of their upper faces, the rollers 24A and 24B having been removed if they are removable, or retracted into their housings if they are retractable, for example as described in the above mentioned French Patent 2,185,520.

In the support frames 6'', each of the two locking devices 50 and locking devices 20A and 20B includes a horizontal lower engagement surface which is adapted to rest, respectively, on the upper corner pieces of an ISO container on which the support frame is placed, that is to say the locking devices 50 are adapted to rest respectively on the corner pieces 2A and 2B of the container 1, while the devices 20A and 20B are adapted to rest on the corner pieces 4A and 4B.

In the arrangement shown in FIG. 7, the bottom container 1 is not only placed on the ground, it is attached by means of a rotary lock, while the two other containers are locked to the container on which they are resting, by means of a double rotary lock 54 as shown in FIG. 8.

The locking device 20B, like the locking devices 20A and 50, is in practice a hollow member, a lower engagement surface 51 of which is formed with an aperture 52 (see FIG. 9) which is open into a free space 53, which enables the double rotary lock 54, disposed between the locking device and the upper corner pieces of the container which is to be engaged, to cooperate with it. Opposed oblong heads 55A and 55B of the double rotary lock 54 pass respectively into the free space 53 of the locking device 20B and a free space 57 of the upper rear right corner device 4B, by passing through the oblong aperture 52 in the locking device 20B and a like aperture 56 in the upper rear right corner device 4B, such that when a lever 58 is operated, the heads 55A and 55B make a quarter turn and then lock the upper rear right corner device 4B and locking device 20B together.

It will be noted that FIG. 9 also shows an oblong head 60 of the locking device 20B, held on the corner piece 5B.

The foregoing description of the locking device 20B applies in the same way to the locking device 20A, for its cooperation with the corner pieces 5A and 4A, and also to the locking devices 50 for their cooperation with the corner pieces 3B and 2B or 3A and 2A.

As already indicated, the invention is not limited to the examples described and shown. Accordingly, the scope of the invention is to be limited only by the following claims.

What is claimed is:

1. A support frame for loading and unloading a container from a vehicle, said support frame supporting a loading apparatus having an articulating arm disposed along a longitudinal symmetrical plane, said container having a front face, a lower face, a pair of upper front corner members, a pair of lower front corner members, and a pair of lower rear corner members, said support frame comprising:

a vertical portion having a lifting member engagable with said articulating arm;

a horizontal portion having a front end, a rear end, and a set of longitudinal rails, said front end being interconnected with said vertical portion; and means mounted to said vertical and horizontal portions for securing said container to said support frame such that said container rigidifies said vertical portion relative to said horizontal portion as a strengthening piece, said securing means comprising:

first attachment means mounted to said vertical portion for attaching said pair of upper front corner members of said container to said vertical portion, said first attachment means supporting said container in a direction transverse to said horizontal portion; and second attachment means mounted to said horizontal portion for attaching said pair of lower rear corner members of said container to said horizontal portion;

whereby said container, when secured to said support frame with said first and second attachment means, is adapted to bear mechanical stresses applied to said support frame during loading and unloading.

2. A support frame according to claim 1, wherein said securing means further comprises third attachment means mounted to said support frame for attaching said pair of lower front corner members of said container to said support frame.

3. A support frame according to claim 2, wherein said third attachment means are mounted to said vertical portion.

4. A support frame according to claim 2, wherein said third attachment means are mounted to said horizontal portion.

5. A support frame according to claim 1, further comprising a plurality of lower engagement surfaces disposed on said horizontal portion for engaging a second said container on which said support frame is placed.

6. A support frame according to claim 5, wherein each of said plurality of lower engagement surfaces has an aperture formed therein and a cavity in communication with said aperture.

7. A support frame according to claim 1, further comprising roller means mounted to said second portion.

8. A support frame according to claim 7, wherein said roller means further comprises means for retracting said roller means.

9. A support frame according to claim 1, wherein said first attachment means further comprises means for moving said first attachment means so as to adjustably accommodate said container.

10. A support frame according to claim 1, wherein said vertical portion comprises:
two inner risers between which said lifting member is disposed, each of said two inner risers being interconnected with said horizontal portion;
lower outer cross members attached to said two inner risers;
outer risers attached to said lower outer cross members; and
a stretcher attached to said two inner risers and said outer risers, said first attachment means being mounted to said stretcher.

11. A support frame according to claim 10, further comprising a third attachment means disposed at said lower outer cross members for attaching said pair of lower front corner members of said container to said vertical portion.

12. A support frame according to claim 10, further comprising an oblique strut interconnecting said second portion with one of said lower outer cross members.

13. A support frame according to claim 10, further comprising a lower stretcher disposed between said two inner risers.

14. A support frame according to claim 1, wherein said horizontal portion comprises:
two longitudinal members, each of said two longitudinal members having a forward end interconnected with said vertical portion and an oppositely disposed rear end;
a cross member interconnecting said rear ends, said second attachment means being disposed at said cross member;
struts interconnecting said cross member with said two longitudinal members; and
at least one stretcher disposed between said two longitudinal members.

15. A support frame according to claim 1 further comprising a set of rollers mounted to said vehicle, said set of longitudinal rails being adapted to roll on said set of rollers.

16. A support frame for loading and unloading a container in cooperation with an articulating arm, wherein said container comprises a front face having a pair of upper front corner members and a pair of lower front corner members, and wherein said container comprises a lower face having a pair of lower rear corner members, said support frame comprising:
a vertical portion having two inner risers, a lifting member disposed between said two inner risers for engagement with said articulating arm, lower cross members attached to said two inner risers, outer risers attached to said lower cross members, and an upper stretcher attached to said inner risers and said outer risers;
a horizontal portion interconnected with said vertical portion at said lower cross members, said horizontal portion having a pair of longitudinal members, a forward end of each of said pair of longitudinal members being attached to said vertical portion, each of said pair of longitudinal members having a rearward end oppositely disposed from said forward end; and
means mounted to said vertical and horizontal portions for securing said container to said support frame such that said container rigidifies said vertical portion relative to said horizontal portion so as to enhance the structural rigidity of said support frame, said securing means comprising:
a first pair of locking devices mounted to said upper stretcher for attaching said pair of upper front corner members to said vertical portions, said first pair of locking devices supporting said container in a direction transverse to said horizontal portion; and
a second pair of locking devices mounted at said rearward ends of said pair of longitudinal members for attaching said pair of lower rear corner members to said horizontal portion;
whereby said container contributes structural rigidity to said support frame when secured to said support frame with said first and second pair of locking devices.

* * * * *

UNITED STATES PATENT AND TRADEMARK OFFICE
CERTIFICATE OF CORRECTION

PATENT NO. : 5,395,203
DATED : March 7, 1995
INVENTOR(S) : Bernard Januel and Michel Robert It is certified that error appears in the above-indentified patent and that said Letters Patent is hereby corrected as shown below:

Column 7, line 26, delete "second" insert ---- horizontal ----.

Column 7, line 56, delete "second" insert ---- horizontal ----.

Signed and Sealed this

Eighteenth Day of July, 1995

Attest:

BRUCE LEHMAN

*Attesting Officer*     *Commissioner of Patents and Trademarks*